United States Patent
Hammes

(10) Patent No.: US 12,061,457 B2
(45) Date of Patent: Aug. 13, 2024

(54) OPTOELECTRONIC SAFETY SENSOR AND METHOD FOR SAFEGUARDING A MACHINE

(71) Applicant: SICK AG, Waldkirch (DE)

(72) Inventor: Markus Hammes, Waldkirch (DE)

(73) Assignee: SICK AG, Waldkirch (DE)

( * ) Notice: Subject to any disclaimer, the term of this patent is extended or adjusted under 35 U.S.C. 154(b) by 507 days.

(21) Appl. No.: 17/333,872

(22) Filed: May 28, 2021

(65) Prior Publication Data

US 2021/0373526 A1    Dec. 2, 2021

(30) Foreign Application Priority Data

May 29, 2020    (DE) .......................... 102020114488.1

(51) Int. Cl.
  *G05B 19/406*    (2006.01)
  *F16P 3/14*    (2006.01)

(52) U.S. Cl.
  CPC ............ *G05B 19/406* (2013.01); *F16P 3/142* (2013.01)

(58) Field of Classification Search
  CPC .... F16P 3/142; F16P 3/144; F16P 3/08; F16P 3/10; G05B 19/406; G01S 17/42; G01S 17/04; G01S 17/86; G01S 7/4817; G01S 7/4865; G01S 7/487; G01S 7/497; G01V 8/12; G01V 8/20
  See application file for complete search history.

(56) References Cited

U.S. PATENT DOCUMENTS

| | | | |
|---|---|---|---|
| 6,829,371 B1* | 12/2004 | Nichani | F16P 3/142 382/242 |
| 8,139,204 B2 | 3/2012 | Braune et al. | |
| 10,325,485 B1* | 6/2019 | Schuster | G01S 7/497 |
| 2003/0076224 A1 | 4/2003 | Braune | |
| 2005/0146605 A1* | 7/2005 | Lipton | G08B 13/19615 375/E7.006 |
| 2018/0347753 A1* | 12/2018 | Böhler | G01V 8/20 |
| 2020/0379430 A1* | 12/2020 | Doettling | F16P 3/08 |

FOREIGN PATENT DOCUMENTS

| | | | | |
|---|---|---|---|---|
| DE | 102005005906 A1 * | 8/2006 | ................ | F16P 3/14 |
| DE | 102005005906 A1 | 8/2006 | | |
| DE | 10360174 B4 | 3/2007 | | |

(Continued)

OTHER PUBLICATIONS

Office Action dated Jan. 7, 2021 issued in corresponding German Application No. 102020114488.1.

*Primary Examiner* — Michael J Vanchy, Jr.

(74) *Attorney, Agent, or Firm* — Nath, Goldberg & Meyer; Jerald L. Meyer

(57) ABSTRACT

An optoelectronic safety sensor (10) for safeguarding a machine (34), the sensor (10) comprising a light receiver (24) for optical detection of object data and a control and evaluation unit (26) configured to use the object data to decide whether a safety-critical object (36) is detected in a vicinity of the machine (34) and in this case to trigger a safety-related reaction, and wherein the control and evaluation unit (26) is further configured to adapt the sensitivity of a criterion for deciding whether a safety-critical object (36) is detected as a function of at least one of previously detected objects and simultaneously detected objects.

13 Claims, 2 Drawing Sheets

(56) References Cited

FOREIGN PATENT DOCUMENTS

| DE | 102015213078 A1 | 1/2017 |
|---|---|---|
| DE | 102019114854 A1 | 12/2020 |
| EP | 1306603 B1 | 3/2005 |
| EP | 3421191 A1 | 1/2019 |
| EP | 3748216 A1 | 12/2020 |

* cited by examiner

OPTOELECTRONIC SAFETY SENSOR AND METHOD FOR SAFEGUARDING A MACHINE

The invention relates to an optoelectronic safety sensor and a method for safeguarding a machine.

The primary goal of safety technology is to protect people from sources of danger, such as from machines in industrial environments. The machine is monitored with the aid of safety sensors, and if there is a situation in which a person is threatened to get dangerously close to the machine, a suitable safeguarding measure is taken.

Safety sensors or safe sensors, i.e. sensors used for personal protection in the sense of safety technology, must operate particularly reliably and therefore meet high safety requirements, for example the EN13849 standard for machine safety and the IEC61496 or EN61496 device standard for electro-sensitive protective equipment (ESPE). A number of measures must be taken to meet these safety standards, such as safe electronic evaluation through redundant, diversified electronics, function monitoring or monitoring of contamination of optical components.

The common safeguarding concept is to configure protective fields that must not be entered by the operating personnel during operation of the machine. In the case of a vehicle, this consideration is also reversed; no persons must enter the travel path, nor is the vehicle allowed to move too quickly in a direction where persons are present. If the sensor detects a forbidden protective field intrusion, it triggers a safety-related reaction consisting of braking, evasive action or, if necessary, an immediate stop of the machine.

In an industrial environment, optoelectronic safety sensors that detect one- or two-dimensional information are most frequently used, such as safety light grids or safety laser scanners. The prior art also knows 3D sensors for detecting three-dimensional image data. These mainly include 3D cameras in various technologies, for example stereoscopy, triangulation, time-of-flight, or those using evaluation of the distortion of passive two-dimensional patterns or of projected illumination patterns. These 3D sensors, unlike a usual two-dimensional camera, capture images that include a distance value in their pixels. The depth-resolved or three-dimensional image data are also called depth maps. Moreover, laser scanners are known that detect multiple scanning planes or vary their elevation angle. These 3D sensors can also be used to monitor protective fields, for example from a bird's eye view above a robot cell. EP 3 421 191 A1, for example, adopts a different safety approach in which the shortest distance from the monitored machine to the detected objects is determined and the hazardous situation is thus assessed (speed-and-separation monitoring).

Despite the sometimes very complex input data and an evaluation that is regularly extremely demanding in order to meet the safety standards, in the end a merely binary decision has to be made as to whether a safety-related reaction has to take place or not. This can conceptually be summarized in a trigger threshold. In a specific implementation, the trigger threshold can be complex and high dimensional and take various aspects into account, such as temporal or geometric properties or, for example, evaluating a course or level of a received signal.

In principle, there is always the possibility that the binary decision is wrong. Two errors are conceivable: Although a person is in danger, the situation is assessed as not dangerous, or a danger is recognized that is not actually present. The first-mentioned error is safety-critical, the second-mentioned error generates unnecessary safety reactions and therefore has a detrimental effect on availability. It is a major challenge, and one that is decisive for the performance of the safety sensor, to tune the trigger threshold in such a way that there is a good balance between detection safety and robustness.

Conventional safety sensors operate with a fixed trigger threshold that is set during development or as part of the configuration process. This trigger threshold must be selected with enough sensitivity to take all eventualities into account. Safety is the priority, since in case of doubt, no person must be endangered for the benefit of machine runtime. However, this means that a fixed trigger threshold set in its sensitivity for certain critical situations also is used in other situations where that sensitivity would not at all be necessary. The probability of unnecessary triggering of the safety function thus increases, and this has significant adverse effects on availability.

With protective field monitoring, the trigger threshold conventionally evaluates only sensor information from the protective field; no safety-related sensor information is obtained from areas outside the configured protective field. The information base is therefore smaller and sometimes significantly smaller than what the sensor itself can provide. This frequently leads to borderline cases where a safety-related reaction is initiated even though objectively there was no relevant protective field intrusion.

It is known to place a so-called warning field in front of a protective field. Detected object intrusions into a warning field do not yet trigger the safety-related reaction, but generate an optical or acoustic warning with the aim of timely preventing the person from going or reaching deeper into the protective field. Warning fields, however, do not provide any information that can be used for safety purposes. The protective field is still configured in such a way that it can ensure safety on its own and independently of the warning field.

Protective fields can be adapted or switched depending on the situation. EP 1 306 603 B1 discloses a method for controlling a safety-relevant function of a machine that determines the position and movement behavior of persons and adapts the protective field limits accordingly. Dynamically adaptable protective fields are also known from EP 2 395 274 B1. Within the respective valid protective fields, however, there is still a fixed trigger threshold, only the geometry of the protective field is dynamic, the criteria of a protective field violation are not.

DE 10 2015 213 078 A1 describes a brake light detection system for a vehicle driving ahead that adjusts a trigger threshold of an active safety system. However, DE 10 2015 213 078 A1 does not define an active safety system as an automatic optical hazard detection system or even a protective field evaluation system, but rather as a driver assistance system that triggers a warning, a prefill of the brakes, hydraulic brake support or automatic emergency braking. The trigger threshold is not defined. Except for emergency braking, these are actions triggered by the driver, and even emergency braking can at least be overridden by the driver.

It is therefore an object of the invention to provide a more reliable safety sensor.

This object is satisfied by an optoelectronic safety sensor for safeguarding a machine, the sensor comprising a light receiver for optical detection of object data and a control and evaluation unit configured to use the object data to decide whether a safety-critical object is detected in a vicinity of the machine and in this case to trigger a safety-related reaction, and wherein the control and evaluation unit is further configured to adapt the sensitivity of a criterion for deciding whether a safety-critical object is detected as a function of at least one of previously detected objects and simultaneously detected objects.

The object is also satisfied by a method for safeguarding a machine, wherein object data are optically detected and evaluated in order to decide whether a safety-critical object is detected in a vicinity of the machine and, in this case, to trigger a safety-related response, and wherein the sensitivity of a criterion for deciding whether a safety-critical object is detected is adapted as a function of at least one of previously detected objects and simultaneously detected objects.

In this specification, safety or safe is used, as is usual in the field of safety technology, in the sense of machine safety. The specific requirements are defined in safety standards for machine safety and personal protection, respectively, some of which are mentioned in the introduction. The safety standards may change over time, but not with regard to the basic principles: Errors are compensated or at least detected by measures such as redundancy, diversity, or tests, with a reliability defined by safety levels (for example SIL, safety integrity level).

The monitored machine in particular operates in an industrial environment. For example, the machine is a robot. The safety sensor can be used in mobile applications and be mounted to move with a vehicle or a machine part. A light receiver detects object data, preferably in two or even three dimensions and, depending on the embodiment, for example in the form of a pixel-resolved image or a point cloud. The object data are evaluated to decide whether a safety-critical object is detected, i.e. whether a safety-relevant object is located in dangerous proximity to the machine. If this is the case, a safety-related reaction is triggered. From the safety sensor's point of view, this means providing corresponding information or instructions as to whether a danger has been detected or not. The safety sensor may, but usually does not decide by itself how the machine is actually acted upon as a result. This this is preferably done in a control system that is directly or indirectly connected to the sensor and the machine.

The invention starts from the basic idea of adapting the criterion for deciding whether a safety-critical object is detected according to the situation. This criterion, as explained in the introduction, can be referred to as the trigger threshold, where the threshold nature refers to the binary result, the evaluation itself can be decidedly complex and need by no means be limited to the comparison of a single value with a single threshold. The criterion is used to set the detection sensitivity and thus ultimately the balance between the two errors of an overlooked danger and a situation falsely judged to be a danger.

Whether in a situation a more sensitive or a more insensitive criterion is to be used is made dependent on objects that have been detected previously and/or on additional objects that are detected at the same time as a potentially safety-critical object. These objects, which are used for the adjustment of the criterion, can be safety-critical objects, (as of yet) non-safety-critical objects, and also interfering objects. The actual danger assessment of whether a safety-critical object is detected thus is preceded by a preliminary assessment. If a danger situation is probable according to the preliminary assessment, a more sensitive criterion is used in order to react in a safety-related manner in case of doubt. If, on the other hand, a safety-critical object is unlikely, only comparatively unambiguous detections will trigger a safety-related reaction while using a less sensitive criterion. This is based on the attention behavior of humans and the fact that dangerous situations announce themselves and do not arise abruptly. However, the adaptation does not necessarily have to react to earlier events. Alternatively or additionally, attention or detection sensitivity can be increased on the basis of objects detected at the same time as the potential danger to be evaluated.

The invention has the advantage that it becomes possible to adjust the detection sensitivity of a safety sensor depending on the situation so that it selects an optimum operating point with regard to detection reliability and machine availability. If a dangerous situation is expected, the safety sensor reacts very fast and sensitively, while it is very robust in other situations where the sensor data do not signal an imminent intrusion. In this way, optimum robustness against interference is achieved with unimpaired reliability and detection safety. Availability and detection reliability can thus significantly be improved.

The control and evaluation unit preferably is configured to detect a safety-critical object using an evaluation of a protective field for object intrusions on the basis of the object data. Throughout this specification, the terms preferably or preferred refer to advantageous, but completely optional features. In this embodiment, the question whether an object is safety-critical or not is therefore decided on the basis of a protective field monitoring. A protective field is a geometrically defined area of space that must not be entered, defined in two or three dimensions depending on the type of safety sensor. Not every protective field intrusion has to be safety-critical by itself; additional conditions such as a minimum extension or duration may be imposed. Protective fields can be predefined and thus static, or it can be switched between different preconfigured protective fields, or their geometry can be adapted dynamically.

It should be emphasized that the adaptation of the sensitivity of a criterion for the decision on safety-critical objects according to the invention is not to be confused with a dynamic protective field. In a dynamic protective field, only its geometry is changed. The conventional decision as to whether this adapted protective field is violated or not, and thus the sensitivity of the protective field monitoring, remains unchanged even with a dynamic protective field. The geometric definition of protective fields and the detection of intrusions into these protective fields are different evaluation levels, which is also reflected in the fact that the invention can be combined with static as well as switched and dynamic protective fields.

The control and evaluation unit preferably is configured to detect a potentially safety-critical object on the basis of the object data before it is safety-critical and to use a more sensitive criterion in the case of detection of a potentially safety-critical object. This is a possible example of a previously or simultaneously detected (not yet) safety-critical object, the detection of which changes the criterion for the ultimate safety decision. Based on this detection, there is an increased probability of a safety-critical object later on, in particular the same object after transition into a safety-critical position and/or motion. Because of that, detection sensitivity is increased.

The control and evaluation unit preferably is configured to detect the potentially safety-critical object on the basis of an evaluation of a preparatory field for object intrusions. A preparatory field is a geometrically defined spatial area, in this respect similar to a protective field, and preferably used as an auxiliary zone in addition to a protective field. In this case, the preparatory field is preferably adjacent to a protective field. By detecting object intrusions into the preparatory field, it is detected that there is an increased probability of future detection of a safety-critical object, in particular an upcoming protective field intrusion.

A preparatory field is similar to a conventional warning field in that it can be geometrically positioned and dimensioned in a similar way, detects an impending protective field intrusion and does not yet trigger a safety-related reaction by itself. However, in contrast to a warning field, a preparatory field is preferably monitored in a safe manner in accordance with the measures of the safety standards, because the change in the sensitivity of the criterion is safety-relevant. A conventional warning field, on the other hand, is a purely additional convenience function intended to increase availability, with the protective field alone continuing to guarantee safety. Thus, if an intrusion in a conventional warning field is missed, this has no effect whatsoever on the protective field monitoring, which is completely independent of the warning field, and thus on safety. A missed intrusion into a preparatory field, on the other hand, would result in an inappropriate adjustment of the sensitivity of the criterion for deciding whether a safety-critical object is detected, and thus the monitoring of the preparatory field is relevant to safety.

The control and evaluation unit preferably is configured to detect the potentially safety-critical object by an additional sensor. In one embodiment, the additional sensor already provides evaluated object information, for example with a position of the potentially safety-critical object or by independently monitoring a preparatory field. Alternatively, it is also conceivable that the additional sensor extends the object data, for example to extend the field of view of the safety sensor, to create an additional perspective, or to add a different measuring principle, in particular in the case of a non-optoelectronic additional sensor.

The control and evaluation unit preferably is configured to use a more sensitive criterion after a detection of a safety-critical object for at least a release time. In this embodiment, the criterion is not adjusted based on a potentially safety-critical object, although this would also be conceivable in a combination of different embodiments. Rather, a safety-critical object had already been identified and was followed by an appropriate safety-related response. There is an increased probability that this safety-critical object is still present, and therefore a more sensitive criterion is set or remains set for a certain duration or release time. All in all, this results in a kind of hysteresis of the detection of a safety-related object, wherein the release state without detection of a safety-related object is only returned to when this is confirmed by a sensitive detection and thus with high reliability.

The control and evaluation unit preferably is configured to use a more sensitive criterion when detecting an interferer, wherein in particular the interferer is detected on the basis of a saturation. The object used for adjusting the criterion is now an interfering object such as a reflector. If such an interferer is in the field of view of the safety sensor, the sensor's detection capability is limited and therefore a more sensitive criterion is used as a precaution. Such a situation can be detected, for example, by saturated areas, measuring points or pixels.

The criterion preferably comprises a minimum number of measuring points associated with an object. There are several ways to adjust the detection sensitivity. One of them is to count the number of measurement points assigned to an object. An object can be obtained, for example, as the result of an object segmentation. In the case of a protective field monitoring, the number of measuring points within the protective field that cannot be assigned to the background can be counted. The fewer measuring points are sufficient to consider an object as detected, the more sensitive the detection becomes. Measuring points can be points of a point cloud, but also pixels of an image.

The criterion preferably comprises a minimum size of an object. With a high detection sensitivity, even a small object is sufficient, with the risk of already considering an insect, a raindrop, or a small false detection point as safety-critical. Conversely, with a low detection sensitivity, a larger object must be detected. The minimum number of measuring points and minimum size of an object criteria are related, but by no means identical. The minimum size takes the neighborhood relations and the geometry of an object into account and measures, for example, the diameter of a point cloud or a pixel cluster. The object distance has an influence, because, for example, a camera generates fewer pixels from a distant object than from a nearby object of the same size. Thus, no clear conclusions can be drawn in any direction between the number of measurement points and the size of the object.

The criterion preferably comprises a number of repeated detections. This is a third exemplary criterion, wherein all these criteria can be combined with each other in any way and can be supplemented by further criteria. It is common practice in safety sensors to have the detection of a safety-critical object confirmed by further detection cycles (scans, frames) before a safety-related response is made. Thus, for example, a flash of light or a falling raindrop is filtered out, which would not be detected repeatedly. The appearance of a person, on the other hand, is not a transient event on these time scales. A different number of m out of n detections that constitute a safety-relevant object detection can be used as a criterion to adjust the detection sensitivity.

The sensor preferably comprises a safe output for outputting a binary safety signal indicating whether or not a safety-critical object is detected. The safe output preferably is a safe switching output (OSSD, Output Signal Switching Device) and, for example, has two channels. The signal at the safe output is used by a connected controller to decide whether to enable the monitored machine or to initiate or maintain the safety-related reaction.

The sensor preferably is configured as a 3D camera, in particular a stereo camera or a time-of-flight camera. The high information content of 3D cameras is only inadequately exploited by conventional protective field evaluation. Through additional monitoring, for example of a preparatory field, further information is included as safety-relevant in order to improve a protective field evaluation. In addition, another type of safety evaluation can also be used, such as speed-and-separation monitoring. The adapted detection sensitivity according to the invention is advantageous also in those alternative safety concepts. There are further alternative possibilities for 3D detection, for example 3D cameras that project a structured illumination pattern and correlate an image with the known illumination pattern, or 2D or 3D laser scanners.

The method according to the invention can be modified in a similar manner and shows similar advantages. Further advantageous features are described in an exemplary, but non-limiting manner in the dependent claims following the independent claims.

BRIEF DESCRIPTION OF THE DRAWINGS

The invention will be explained in the following also with respect to further advantages and features with reference to exemplary embodiments and the enclosed drawing. The Figures of the drawing show in:

FIG. 1 shows a schematic block diagram of a safety sensor 10 in an embodiment as a 3D time-of-flight (TOF) camera. The safety sensor 10 is used to safeguard a moving machine. Examples include machines in industrial environments or operation of a robot. Another field of application is vehicles, particularly in closed environments, more particularly in the field of factory and logistics automation. In particular, driverless vehicles such as AGVs (Automated Guided Vehicle), AMR (Autonomous mobile robot) or industrial trucks should be mentioned.

Figure 1:
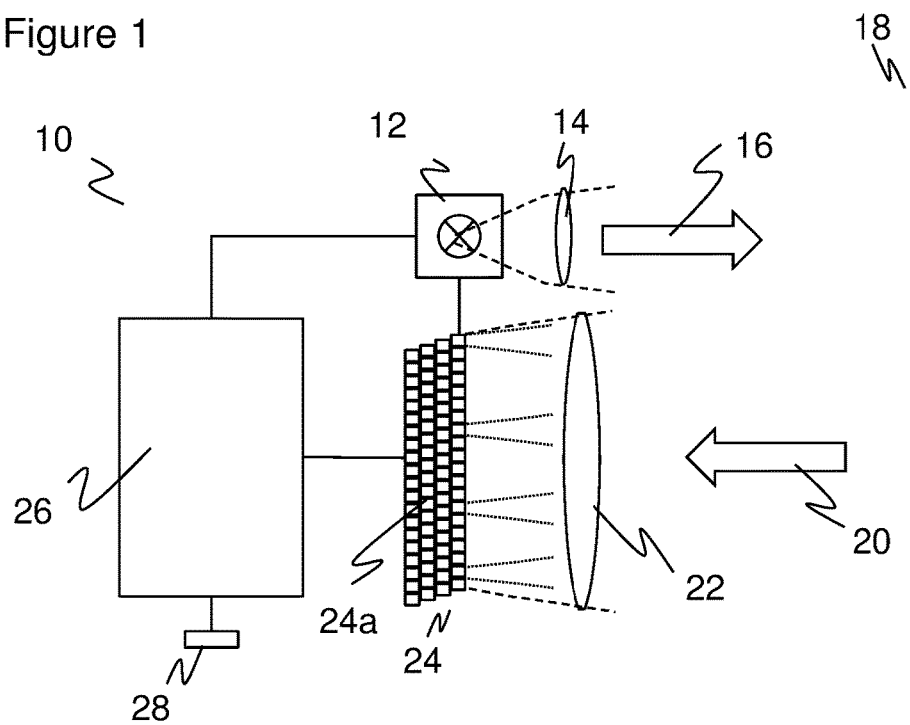
FIG. 1 a schematic block diagram of a safety sensor.

An illumination unit 12 transmits, through transmission optics 14, modulated transmitted light 16 into a monitoring area 18. LEDs or lasers in the form of edge emitters or VCSELs can be used as light sources. The illumination unit 12 can be controlled such that the amplitude of the transmitted light 16 is modulated at a frequency typically in the range of 1 MHz to 1000 MHz. The modulation preferably is periodic, for example sinusoidal or rectangular. Also conceivable are unique pulse patterns with a correlation signal being evaluated.

If the transmitted light 16 impinges on an object in the monitoring area 18, a portion is reflected back to the safety sensor 10 as received light 20 and is guided through receiving optics 22, for example a single lens or a receiving lens, to an image sensor 24. The image sensor 24 comprises a plurality of light-receiving elements or receiving pixels 24a arranged, for example, in a matrix or a line. The resolution of the image sensor 24 may range from two or a few to thousands or millions of receiving pixels 24a. In the receiving pixels 24a, the received signal is demodulated at the same frequency used to modulate the transmitted light 16 (lock-in method). Multiple in-phase integrations are performed to sample the received signal, and the phase offset between the transmitted light 16 and the received light 20 and thus the distance to the object can be reconstructed.

A control and evaluation unit 26 is connected to the illumination unit 12 and the image sensor 24 to coordinate the light time of flight measurement and to read out the three-dimensional image data from the image sensor 24. In addition, a two-dimensional image can be obtained for example by integration over all phases. The control and evaluation unit 26 evaluates the image data to determine whether a safety-critical object is detected. In further explanation with reference to FIGS. 2 and 3, this is done by a protective field evaluation. These protective fields may be preconfigured. Alternatively, a set of protective fields is configured, with a switching between them depending on the work step of the machine or, for example, the speed and/or direction of movement of a vehicle to be safeguarded. Dynamic protective fields are also conceivable. Instead of a protective field evaluation, object positions and object movement can be evaluated, as in the case of speed-and-separation monitoring.

A safe interface 28 is configured as an OSSD (Output Signal Switching Device) to trigger a safety-related response of the mobile machine safeguarded with the safety sensor 10, either directly or via a safety controller, in the event of detection of a safety-critical object.

The embodiment of the safety sensor 10 as a 3D time-of-flight camera is only one example. Alternatively, the safety sensor 10 can be another optoelectronic 3D sensor, for example a stereo camera, a camera with evaluation of a projected illumination pattern or a 3D scanner in the form of a multi-layer scanner or a scanner with additional scanning movement in elevation. Two-dimensional safety sensors are also conceivable, for example with a line-shaped image sensor or in the form of a 2D laser scanner.

Figure 2:
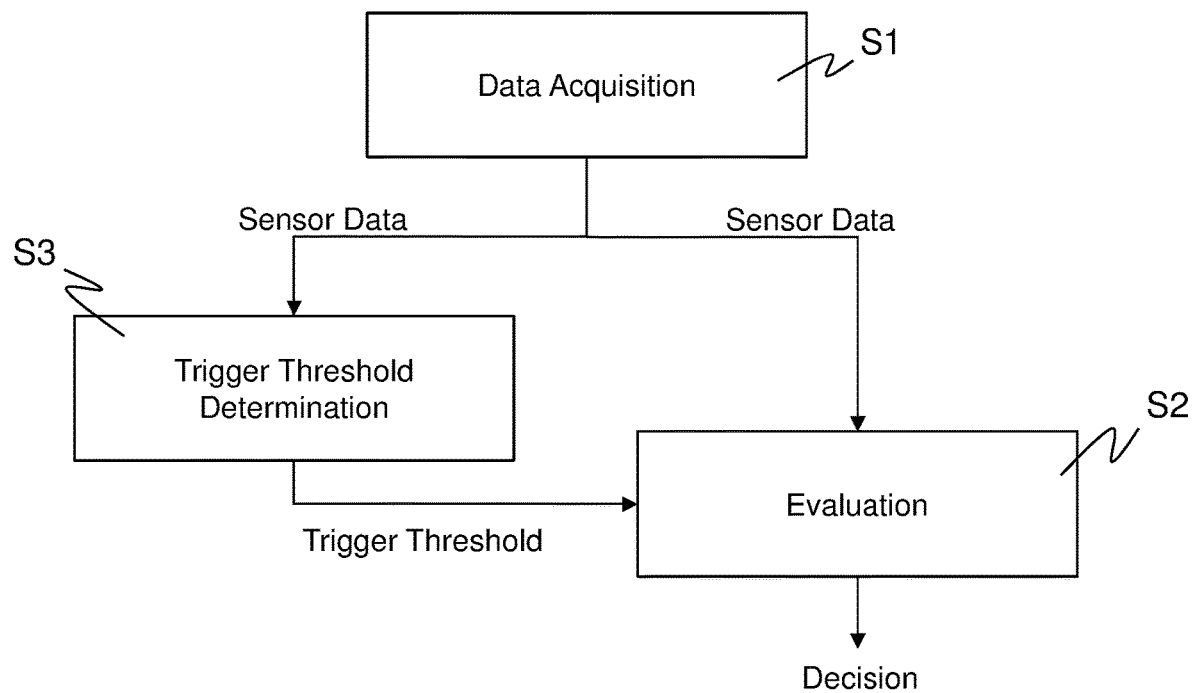
FIG. 2 an exemplary flow chart for adjusting the detection sensitivity of a safety sensor.

FIG. 2 shows an exemplary flow chart for the situation-dependent adaptation of the detection sensitivity of the safety sensor 10. In a step S1, the data acquisition takes place, for example the acquisition of a 3D image. The actual task of evaluating the safety sensor 10 is, in a step S2, to derive a switching decision from the available sensor information that can be used for safety purposes, indicating whether or not a danger exists and whether or not a safety-related reaction is to be initiated. This can be a very complex task, for example the evaluation of a protective field or the evaluation of a position and movement of an object in the vicinity of the machine to be safeguarded. As already mentioned in the introduction, this is summarized in the simplified term of evaluation with a trigger threshold.

Conventionally, this would describe the mode of operation of a safety sensor 10. According to the invention, however, in a step S3 the sensor data, in one embodiment also sensor data of an additional sensor, are used in a further evaluation. Based on this further evaluation, the trigger threshold or the detection sensitivity of the safety sensor 10 is adjusted. If, according to the additional evaluation in step S3, a safety-critical object is not to be expected in the near future, a non-sensitive trigger threshold is set so that the detection of safety-critical objects is particularly robust. Conversely, a sensitive trigger threshold is used if a safety-critical object is expected to be detected, for example because an object is already in close proximity to a protective field.

Figure 3:
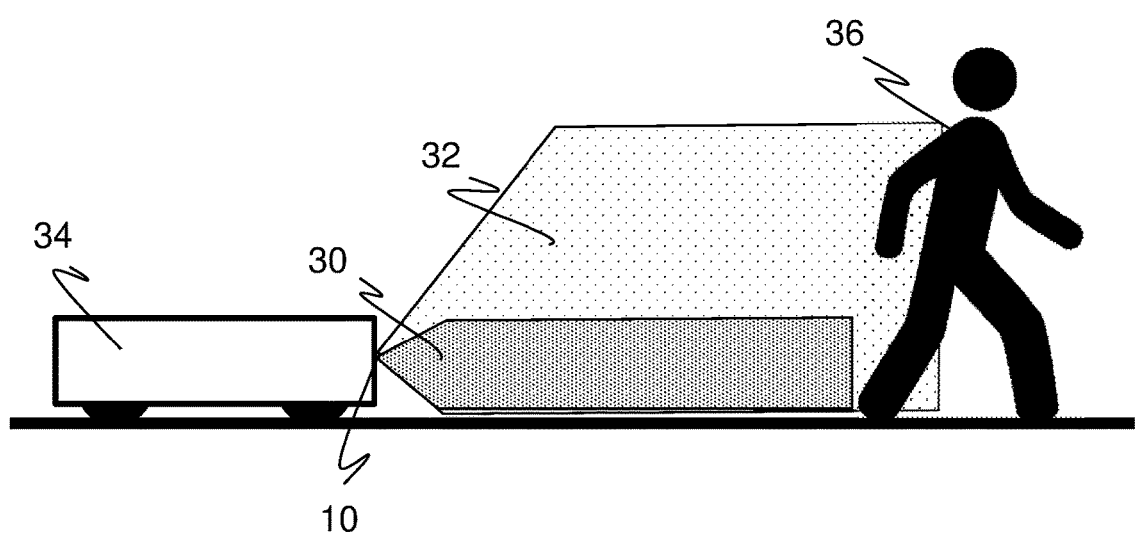
FIG. 3 a schematic representation of a protective field and a preparatory field for adjusting the detection sensitivity in the protective field.

FIG. 3 shows a schematic representation of a protective field 30 and a preparatory field 32 adjacent to the protective field 30 for adjusting the detection sensitivity in the protective field 30. The monitoring of protective fields 30 and preparatory fields 32 is an advantageous, but nevertheless only exemplary embodiment for steps S2 and S3 according to FIG. 2.

In FIG. 3, an autonomous logistics vehicle 34 is protected as a representative of a machine to be monitored, with the safety sensor 10 being shown only as the starting point for monitoring the protective field 30 or preparatory field 32.

The configuration of a protective field 30 is basically up to the user, although safety standards must of course be observed to ensure that the protective field 30 fulfills its protective function. It can be advantageous to configure a relatively small protective field 30 as in FIG. 3 in order to avoid stationary structures in the operating range or to minimize the effective range of interference. If the safe switching decision were made solely on the basis of the small protective field 30, then this would be based on an unnecessarily small information base, because the safety sensor 10 covers a significantly larger area.

For this reason, the preparatory field 32 is also monitored for object intrusions as a kind of auxiliary zone. If a person or other safety-relevant object 36 is located in the preparatory field 32, a more sensitive trigger threshold is set in step S3 of FIG. 2 than in case of the preparatory field 32 being free.

Thus, if the areas adjacent to the protective field 30 are free of objects 36, which is checked by monitoring the preparatory field 32, a danger is not expected and the evaluation in step S2 of FIG. 2 is performed with a lower detection sensitivity. Then, the safety sensor 10 is very robust against interference. Conversely, if an object 36 is located in the preparatory field 32 and thus in the vicinity of the protective field 30, caution is required and the detection sensitivity is increased. In this way, it is always ensured that there is an optimal balance between robustness and detection reliability, regardless of the configured size or geometry of the protective field 30.

It should be emphasized that the additional information used in the detection sensitivity adaption is relevant to safety. This information therefore is detected and evaluated with the same reliability as with a protective field evaluation. This is different from a conventional warning field, which is a kind of convenience function that concerns availability alone and is completely independent of the actual safety function.

As one criterion for deciding whether a safety-critical object is detected, the number of measurement points within the protective field 30 can be used. Measurement points are, for example, the points of a point cloud of a laser scanner or the pixels of a depth map of a 3D camera. When a safety-related object 36 is located in the protective field 30, it causes a plurality of measurement points to be detected within the protective field 30. These are counted and compared to a trigger threshold.

Without the adjustment of the trigger threshold according to step S2, a fixed number of measuring points would have to be specified. Particularly with a small protective field 30, it would have to be assumed that a safety-relevant object 36 would only provide very few measuring points within the protective field 30 in boundary cases and taking into account interfering influences. As a precaution, a fixed trigger threshold would therefore have to be set very sensitively so that the safety sensor 10 triggers a safety-related reaction even with a small number of measuring points within the protective field 30. This could quickly lead to unnecessary safety-related reactions in particular in the event of interference.

By monitoring the preparatory field 32, the trigger threshold can be modified depending on the situation. Only when a potentially safety-critical object 36 is detected in the preparatory field 32, the detection sensitivity is increased to the small number of measuring points. As long as there no object 36 in the preparatory field 32 and thus in the vicinity, a larger number of measuring points is required in the protective field 30 to trigger the safety-related response. In this mode with a high trigger threshold, the safety sensor 10 is very robust against disturbing influences and false detections. The two-stage adaptation could of course also be refined, for example by staggered preparatory fields of different valence with increasing approach to the protective field 30.

In a specific example, the safety sensor 10 detects a 3D depth map with a plurality of pixels, each encoding a distance value. In the case of a clear path of travel or only distant objects 36 outside the preparatory field 32, the detection sensitivity is decreased and a higher number of measuring points in the protective field 30, for example 400 pixels, is required for the detection of a safety-critical object 36 before a safety-related response is triggered. If, on the other hand, an object 36 is detected in the preparatory field 32 and thus at the boundary of the protective field 30, the required number of measuring points in the protective field 30 is reduced, for example to 100 pixels. This increases the detection sensitivity and avoids the risk of detection losses. It is quite conceivable that the object 36 has already partially penetrated the protective field 30 in this state, but still with too few pixels, such as 75 pixels, so that it is not yet evaluated as a safety-critical object 36. Therefore, it is useful if the preparatory field 32 overlaps or encloses the protective field 30 as shown, so that the high detection sensitivity is not abandoned because the object 36 leaves the preparatory field 32 in the direction of the protective field 30.

Counting measurement points as a basis for evaluation with the trigger threshold is only one example. Other criteria that can be adapted for modified detection sensitivity are the minimum extension of an object 36 or the required number of consecutive detections. These examples are not exhaustive, as other features such as textures or contrasts are also optically detectable and can be evaluated differently depending on the desired detection sensitivity.

If, unlike in the example of FIG. 3, a protective field 30 has already been violated by intrusion of an object 36, in particular over a longer period of time, the trigger threshold can also be lowered to avoid the risk of detection losses due to interference. This can be achieved in part by the aforementioned overlapping of protective field 30 and preparatory field 32. However, a detected protective field violation is once again a different category, which may also entail a different adjustment of the detection sensitivity, and furthermore, this is independent of whether there is an overlap between protective field 30 and preparatory field 32.

Thus, in this embodiment, as soon as a protective field intrusion has taken place and the safety sensor 10 provides a corresponding switching signal at the safe interface 28, the trigger threshold for the coming triggering cycles is lowered to a sensitive value or maintained at a sensitive value. If a safety-critical object 36 has been detected in a measurement cycle, it is likely that it will still be in the protective field 30 in subsequent measurement cycles. If the object disappears from the protective field 30, the trigger threshold is only slowly raised after the disappearance. In this sense, the adjustment of the trigger threshold has a hysteresis.

Not only potentially safety-critical objects 36 can trigger an adjustment of the detection sensitivity, but also interfering objects. These are, for example, reflectors or sources of ambient light, but also not necessarily objects in the material sense, but also, for example, missing depth information. Retroreflectors in particular have a considerable interfering effect on detection by falsifying or destroying measurement points. On the other hand, they can be recognized by a clear signature, e.g. by a saturation of affected pixels or by an extremely high reception level.

To counteract such detection losses, the detection sensitivity can be increased as soon as interfering objects are detected, for example on the basis of saturated pixels. A corresponding method is possible in particular whenever an indication or a clear signature of a relevant interfering influence can be detected in the preparatory field 32. Saturated pixels in a protection field 30 are preferably evaluated as relevant object pixels.

Detections in the preparatory field 32 and/or previous detections of a safety-critical object 36, for example detected in a protective field 30, can be used to adjust the detection sensitivity as described. Another alternative is to use external data, for example, from at least one additional sensor. The additional sensor monitors the preparatory field 32, for example, and transmits information to the safety sensor 10 as to whether an object 36 is located there. It is also conceivable to expand the sensor data with the additional sensor and then process the joint sensor data of the safety sensor 10 and the additional sensor in analogy to the explanations with reference to FIG. 2, either from a new perspective of the additional sensor or even with its other optical or non-optical sensor principle.

The invention claimed is:

1. An optoelectronic safety sensor (10) for safeguarding a machine (34), the sensor (10) comprising a light receiver (24) for optical detection of object data and a control and evaluation unit (26), wherein the control and evaluation unit (26) is configured to:
perform a preliminary visual assessment to adapt a sensitivity of a criterion for deciding whether a safety-critical object (36) is detected as a function of at least one of previously detected objects and simultaneously detected objects;
use the object data and a comparison with the criterion to decide whether the safety-critical object (36) is detected in a vicinity of the machine (34); and
trigger a safety-related reaction when the safety-critical object (36) is determined to be detected in the vicinity of the machine (34),
wherein, during the preliminary visual assessment, the control and evaluation unit (26) is configured to detect a potentially safety-critical object on the basis of the object data before it is safety-critical and to use a more sensitive criterion in the case of detection of the potentially safety-critical object (36), and
wherein the control and evaluation unit (26) is configured to detect the potentially safety-critical object (36) during the preliminary visual assessment using an additional sensor, the additional sensor determining a position of the potentially safety-critical object or monitoring a preparatory field.

2. The safety sensor (10) according to claim 1,
wherein the control and evaluation unit (26) is configured to detect a safety-critical object (36) using an evaluation of a protective field (30) for object intrusions on the basis of the object data.

3. The safety sensor,
wherein the control and evaluation unit (26) is configured to detect the potentially safety-critical object (36) on the basis of an evaluation of the preparatory field for object intrusions.

4. The safety sensor (10) according to claim 1,
wherein the control and evaluation unit (26) is configured to use a more sensitive criterion after a detection of a safety-critical object (36) for at least a release time.

5. The safety sensor (10) according to claim 1,
wherein the control and evaluation unit (26) is configured to use a more sensitive criterion when detecting an interferer.

6. The safety sensor (10) according to claim 5,
wherein the interferer is detected on the basis of a saturation.

7. The safety sensor (10) according to claim 1,
wherein the criterion comprises a minimum number of measuring points associated with an object (36).

8. The safety sensor (10) according to claim 1,
wherein the criterion comprises a minimum size of an object (36).

9. The safety sensor (10) according to claim 1,
wherein the criterion comprises a number of repeated detections.

10. The safety sensor (10) according to claim 1,
comprising a safe output (28) for outputting a binary safety signal indicating whether or not a safety-critical object (36) is detected.

11. The safety sensor (10) according to claim 1,
which is configured as a 3D camera, a stereo camera or a time-of-flight camera.

12. A method for safeguarding a machine (34), comprising:
performing a preliminary visual assessment to adapt a sensitivity of a criterion for deciding whether a safety-critical object (36) is detected as a function of at least one of previously detected objects and simultaneously detected objects;
using object data which are optically detected and evaluated and a comparison with the criterion to decide whether the safety-critical object (36) is detected in a vicinity of the machine (34); and
triggering a safety-related response when the safety-critical object (36) is determined to be detected in the vicinity of the machine (34),
wherein, during the preliminary visual assessment, detection is performed for a potentially safety-critical object on the basis of object data before it is safety-critical, a more sensitive criterion being used in the case of detection of the potentially safety-critical object (36), and
wherein an additional sensor is used to detect the potentially safety-critical object (36) during the preliminary visual assessment, the additional sensor determining a position of the potentially safety-critical object or monitoring a preparatory field.

13. An optoelectronic safety sensor (10) for safeguarding a machine (34), the sensor (10) comprising a light receiver (24) for optical detection of object data and a control and evaluation unit (26), wherein the control and evaluation unit (26) is configured to:
perform a preliminary visual assessment to adapt a sensitivity of a criterion for deciding whether a safety-critical object (36) is detected as a function of at least one of previously detected objects and simultaneously detected objects;
use the object data and a comparison with the criterion to decide whether the safety-critical object (36) is detected in a vicinity of the machine (34); and
trigger a safety-related reaction when the safety-critical object (36) is determined to be detected in the vicinity of the machine (34),
wherein, during the preliminary visual assessment, the control and evaluation unit (26) is configured to detect a potentially safety-critical object on the basis of the object data before it is safety-critical and to use a more sensitive criterion in the case of detection of the potentially safety-critical object (36), and
wherein the control and evaluation unit (26) is configured to detect the potentially safety-critical object (36) during the preliminary visual assessment using an additional sensor, the additional sensor performing a function selected from the group consisting of extending a field of view of the safety sensor, creating an additional perspective in combination with the safety sensor, performing non-optical detection, and combinations thereof.

* * * * *

UNITED STATES PATENT AND TRADEMARK OFFICE
CERTIFICATE OF CORRECTION

| | | |
|---|---|---|
| PATENT NO. | : 12,061,457 B2 | Page 1 of 1 |
| APPLICATION NO. | : 17/333872 | |
| DATED | : August 13, 2024 | |
| INVENTOR(S) | : Markus Hammes | |

It is certified that error appears in the above-identified patent and that said Letters Patent is hereby corrected as shown below:

In the Claims

Claim 3, Column 13, Line 35, please insert the phrase --according to claim 1-- after "The safety sensor".

Signed and Sealed this
Twenty-fourth Day of September, 2024

Katherine Kelly Vidal
*Director of the United States Patent and Trademark Office*